United States Patent [19]

Scarborough

[11] Patent Number: 5,078,023
[45] Date of Patent: Jan. 7, 1992

[54] THUMB-OPERATED THROTTLE CONTROL

[76] Inventor: Gary H. Scarborough, RR #3, Bobcaygeon, Canada, K0M 1A0

[21] Appl. No.: 517,022

[22] Filed: May 1, 1990

[30] Foreign Application Priority Data

May 9, 1989 [CA] Canada ............................ 599073

[51] Int. Cl.⁵ .................................... F16C 1/10
[52] U.S. Cl. .................................. 74/502.2; 74/489
[58] Field of Search ............ 74/523, 524, 489, 502.2, 74/526

[56] References Cited

U.S. PATENT DOCUMENTS

| | | | |
|---|---|---|---|
| 2,560,154 | 7/1951 | Brown | 74/489 |
| 4,222,285 | 9/1980 | Kine | 74/489 |
| 4,611,500 | 9/1986 | Nagaro | 74/502.2 X |

FOREIGN PATENT DOCUMENTS

| | | | |
|---|---|---|---|
| 136533 | 3/1950 | Australia | 74/502.2 |
| 422596 | 5/1948 | Italy | 74/502.2 |
| 471150 | 12/1952 | Italy | 74/502.2 |
| 792769 | 2/1958 | United Kingdom | 74/489 |

Primary Examiner—Rodney M. Lindsey

[57] ABSTRACT

A primary throttle lever connected to a secondary lever affords a throttle control engagement to a throttle cable initially with a high lever ratio to ease thumb pressure at low throttle settings. The motion of an axial slot which end of said slot eventually engages a limiting pin ensures subsequent motion of the secondary lever attached to said limiting pin. The consequential motion of said secondary lever affords a lower lever ratio for higher throttle settings. Said sequential lever ratios being set at manufacture and the travel limits of said sequential lever ratios being user adjustable.

10 Claims, 6 Drawing Sheets

THUMB-OPERATED THROTTLE CONTROL

BACKGROUND

Many recreational vehicles employ thumb operated throttle controls. Often much time is spent at slow to mid-range throttle positions for long periods of time. Many recreational vehicles employ single pivoting levers which have proved reliable and safe. Generally, the human thumb tires rapidly when holding in place a spring loaded lever. An asset to marketing would be to ease the thumb pressure required at lower and cruising throttle settings.

SUMMARY OF THE INVENTION

The accompanying disclosure will show a thumb operated throttle control which can have a variety of factory set sequential lever ratios. User adjustable motion limits will also be shown to provide a very versatile control useful for a wide variety of control characteristics.

BRIEF DESCRIPTION OF THE DRAWINGS

By engaging a throttle cable with a thumb operated lever assembly, initially with a high lever ratio to ease the required thumb force, and subsequently with a secondary lever affording a lower lever ratio, a versatile thumb-operated control is attained.

The invention will further be described, by way of example only, with reference to the accompanying drawings wherein.

Figure 1:
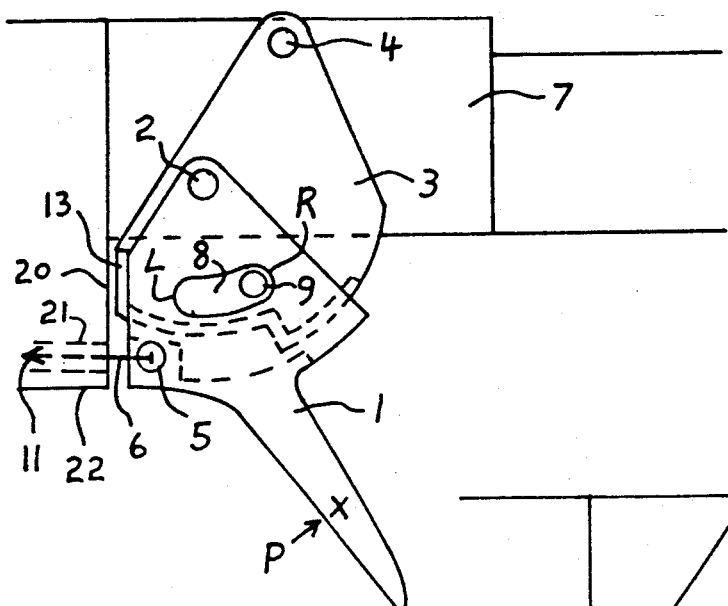
FIG. 1 is a side elevational view of the control at the closed or idle position.

In the preferred embodiment a primary lever 1 is secured to a secondary lever 3 via pivot pin 2. The secondary lever is subsequently secured to a handlebar housing 7 which is used as a lever mounting bracket. The handlebar housing is typically part of a recreational vehicle steering system. An extension of the handlebar 10 is used as a handgrip adjacent to the lever assembly.

PREFERRED EMBODIMENTS

By engaging a throttle cable with a thumb operated lever assembly, initially with a high lever ratio, to ease required thumb force and subsequently with a secondary lever affording a lower lever ratio, a versatile thumb-operated control is attained.

Referring to accompanying FIG. Nos. 1, 2, 3, 5, 6, 7, 8 & 9. For simplicity of explanation of the design and action of the preferred embodiment we shall show only one side of the control. The same corresponding design and action is present on the other side of the these views. The primary lever 1 straddles the secondary lever 3 which in turn straddles the handlebar 7. (See FIG. 4, a top view)

Figure 4:
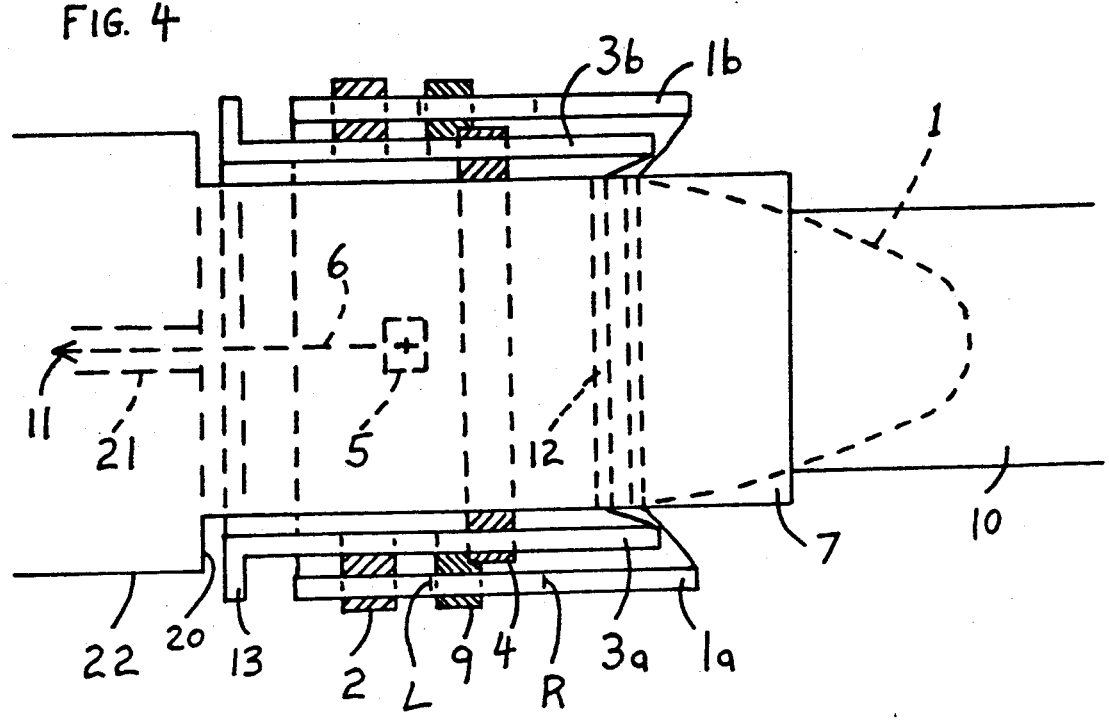
FIG. 4 is a view showing a bifurcate lever construction of the levers at the mid-range position.
Figure 5:
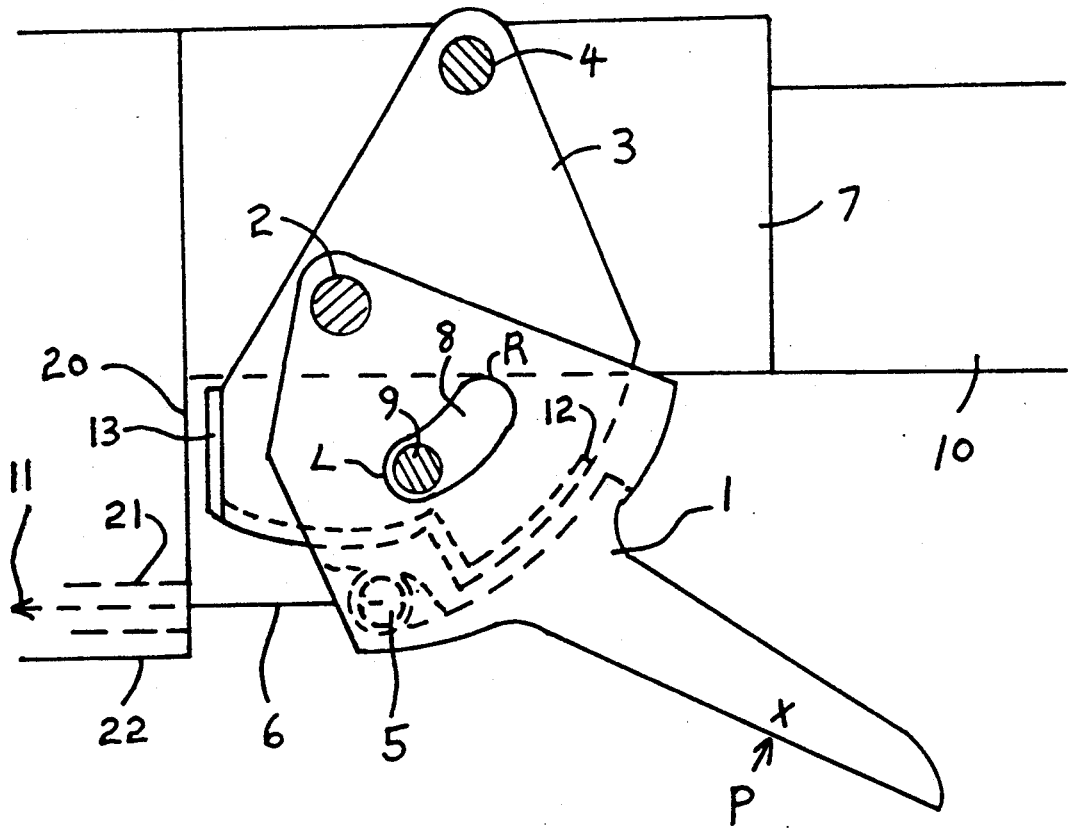
FIG. 5 is side view of FIG. 4.

FIG. 4 shows a control wherein the primary lever 1 includes two generally parallel plate-like limbs 1a and 1b adapted to straddle the secondary lever 3. This secondary lever 3 in turn is of bifurcate construction having two generally parallel platelike limbs 3a and 3b which are adapted to straddle the lever mounting bracket 7.

In the preferred embodiment a primary lever 1 is secured to a secondary lever 3 via pivot pin 2. The secondary lever 3 is subsequently secured to a handlebar 7 via pivot pin 4. The handlebar 7 typically is part of a recreational vehicle steering system. An extension 10 is used as a hand grip.

A spring-loaded throttle cable 6 is attached to the primary lever 1 via cable attachment pivot 5. A throttle cable housing 21 is secured to an extension 22 perpendicular to the handlebar 7 which edge of said extension also forms an idle stop 20 for the secondary lever 3. The other end of the throttle cable 6 is typically attached to a power control system which regulates vehicle speed. Typically, the spring-loading of the throttle cable 6 takes place at the power control end of the throttle cable. (See reference 11.) Arrow 11 shows the direction of the spring-loading. This spring-loading will return the throttle cable 6 to the idle position as shown in FIG. 1 with thumb to lever pressure P removed. Thumb pressure P is applied at point X on the primary lever 1. (See FIG. 1)

At initial throttle engagement by pressure P from the operator's thumb the primary lever 1 alone pivots on pin 2 and in turn extends the throttle cable 6 via the attachment pivot 5.

A limiting pin is positioned and attached to the secondary lever 3. A slot 8 axial to pivot pin 2 is located on the primary lever 1. The limiting pin 9 fits into the axial slot 8. The axial slot 8 can now move in relation to the limiting pin 9 as the primary lever 1 pivots about pin 2.

The positioning of the limiting pin 9 and the length of the axial slot 8 set the limits of primary lever 1 motion in relation to the secondary lever 3.

In the idle position of FIG. 1 the limiting pin 9 engages the end of slot 8 marked R and ensures that the secondary lever 3 engages idle stop 20 which in turn sets the idle position of the primary lever 1.

Figure 2:
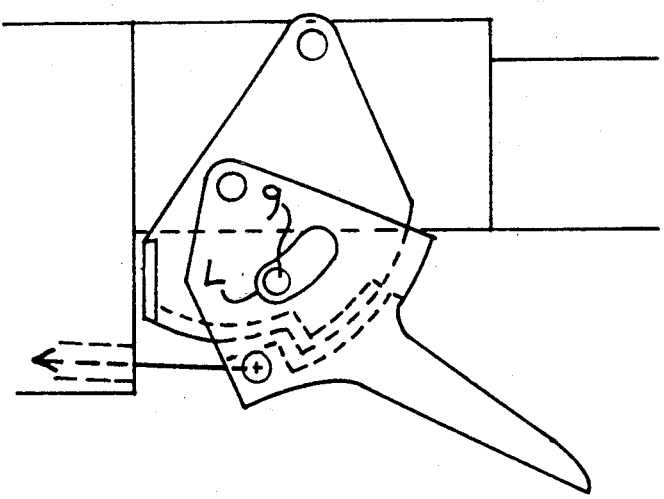
FIG. 2 is a side view of the control at mid-range position.

As the thumb pressure P increases the primary lever 1 advances from the idle position of FIG. 1 to the mid-range position of FIG. 2 as the slot 8 allows the primary lever 1 to pivot freely until pin 9 engages slot end marked L.

Figure 3:
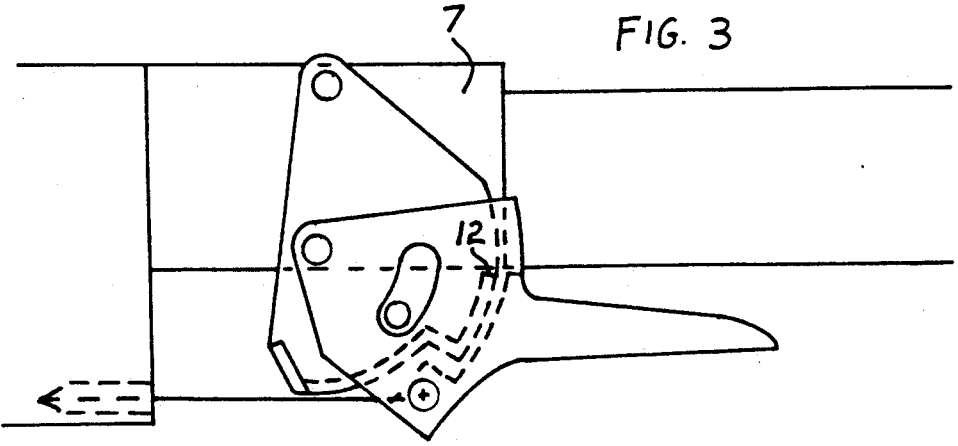
FIG. 3 is a side view of the control at full open position.

In the mid-range position of FIG. 2 to the full throttle position of FIG. 3 the limiting pin 9 has engaged the end of the slot 8 marked L and ensured that the primary lever 1 will engage and move the secondary lever 3 as thumb pressure P is increased.

In this embodiment the motion of the throttle cable 6 is controlled solely by the pivoting of the primary lever 1 during idle to mid-range motion. The area marked X is approximately where thumb pressure P occurs. This embodiment affords an easing of thumb to lever force requirement because of the lever ratio of X to 2 by 2 to 5 in the idle to mid-range positions, as compared to the ratio of X to 4 by 4 to 5 in the mid-range to full throttle positions. (See FIG. 7)

Figure 7:
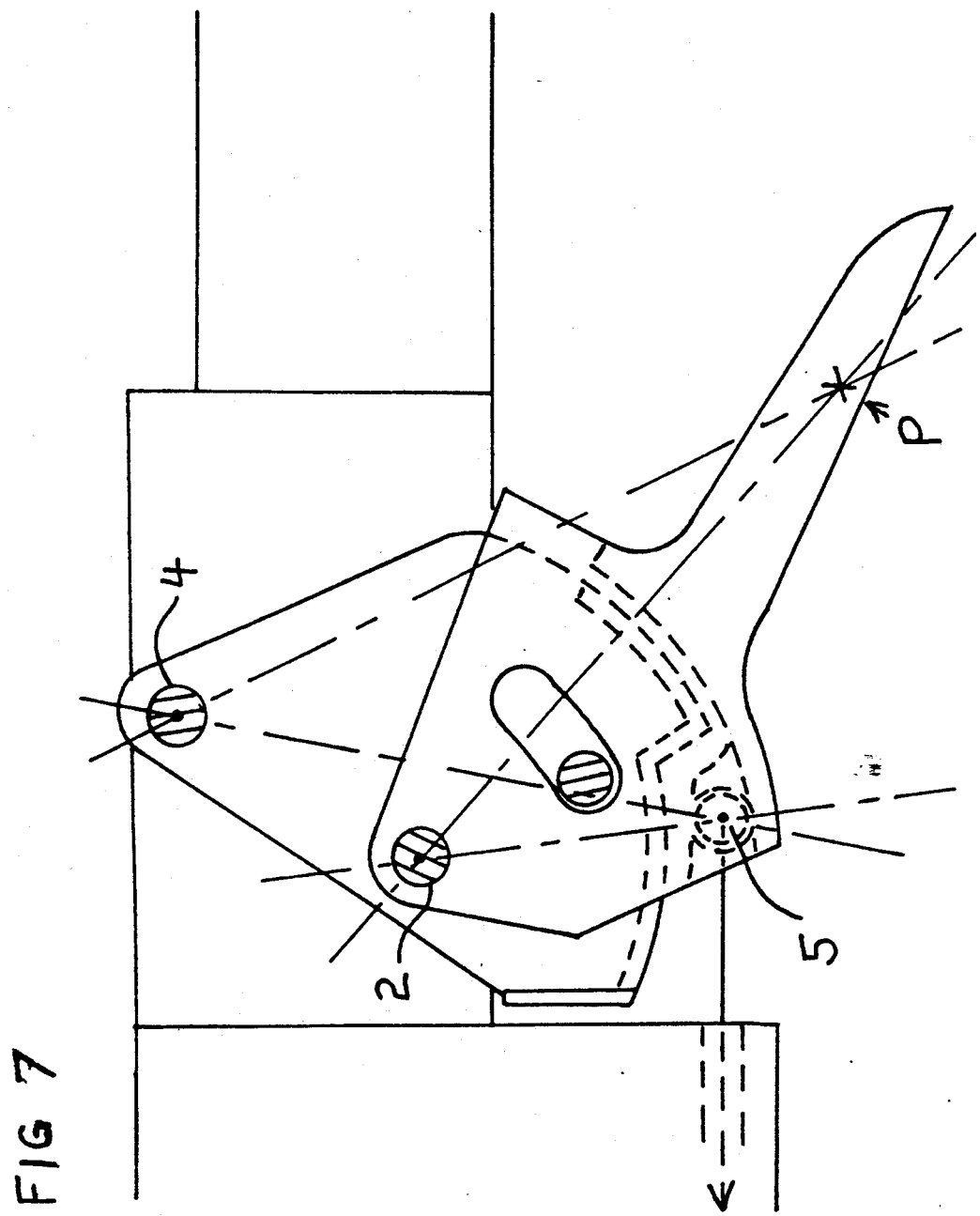
FIG. 7 is a descriptive side view showing lever ratios at mid-range position.

FIG. 7 shows the position of the control where increased thumb pressure P shifts the pivoting from pivot point 2 to pivot point 4.

In FIGS. 1 to 5 flange 13 is shown but is not necessary as pin 9 engaging slot end R duplicates its function.

Figure 6:
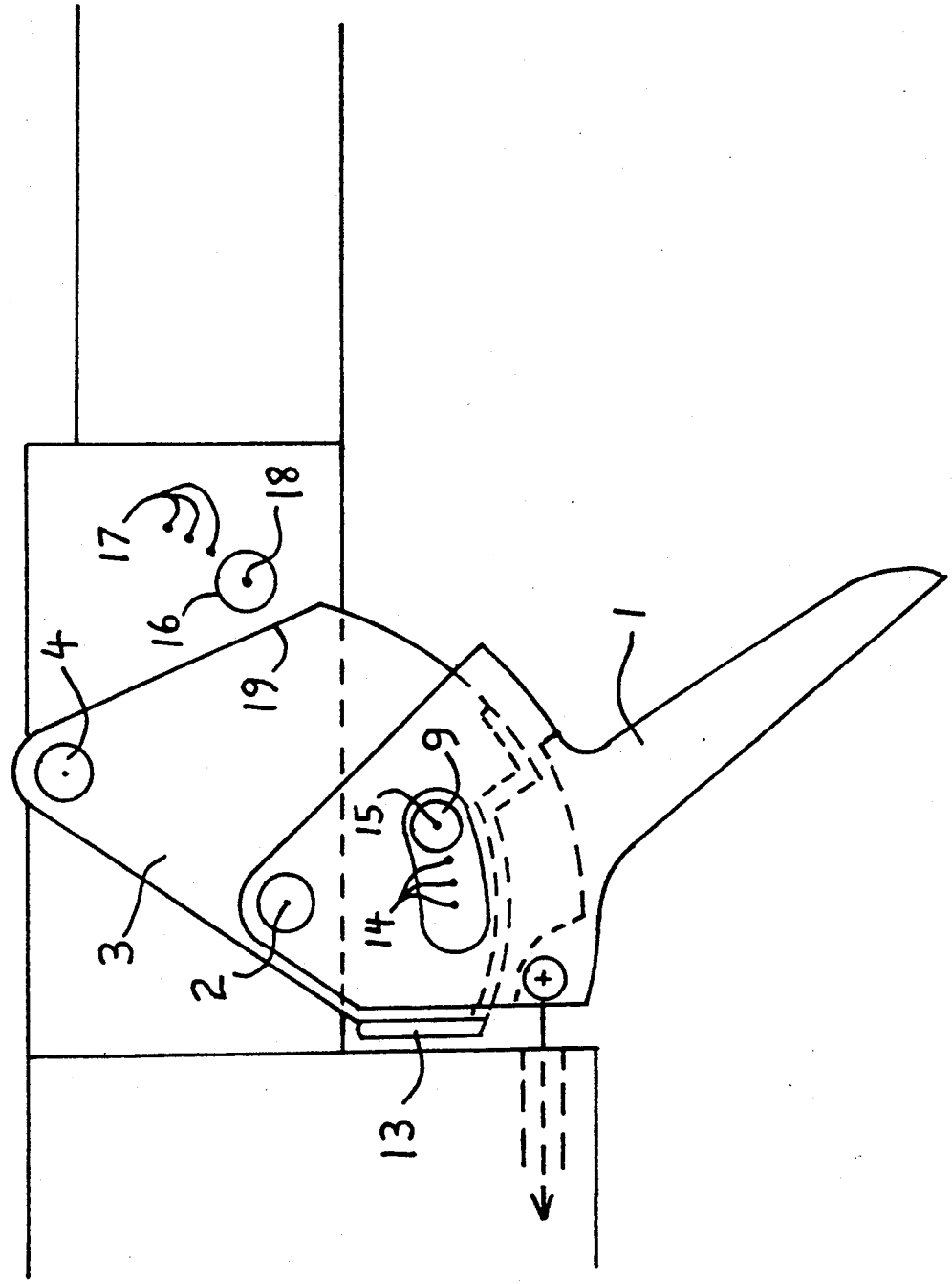
FIG. 6 is a side elevational view showing user adjustments.

However, in the embodiment of FIG. 6 the flange 13 is necessary to ensure that the primary lever 1 returns the secondary lever 3 to the idle position as shown in FIG. 1.

In the embodiment of FIG. 6 the limiting pin 9 is a user adjustable threaded pin. Its location can be adjusted by installing it in successive threaded holes 14 which are located on the secondary lever 3, axial to pivot pin 2, and located in a clockwise position relative to position 15. This will allow the operator to tailor the amount of travel with relatively easy thumb pressure, as primary lever 1 pivots about point 2 and before secondary lever 3 is engaged.

In FIG. 3 the secondary lever full throttle stop point 12 contacts the handlebar 7 and limits the full throttle travel of the throttle assembly. This point 12 can be factory calibrated. However, as shown in FIG. 6, a threaded limiting pin 16 which can be installed in successive threaded holes 17 counterclockwise to position 18 can be used for in-service adjustment of the full throttle limit position. As the secondary lever 3 pivots about point 4 the edge marked 19 will engage the pin 18 and set the full throttle stop position.

Figure 8:
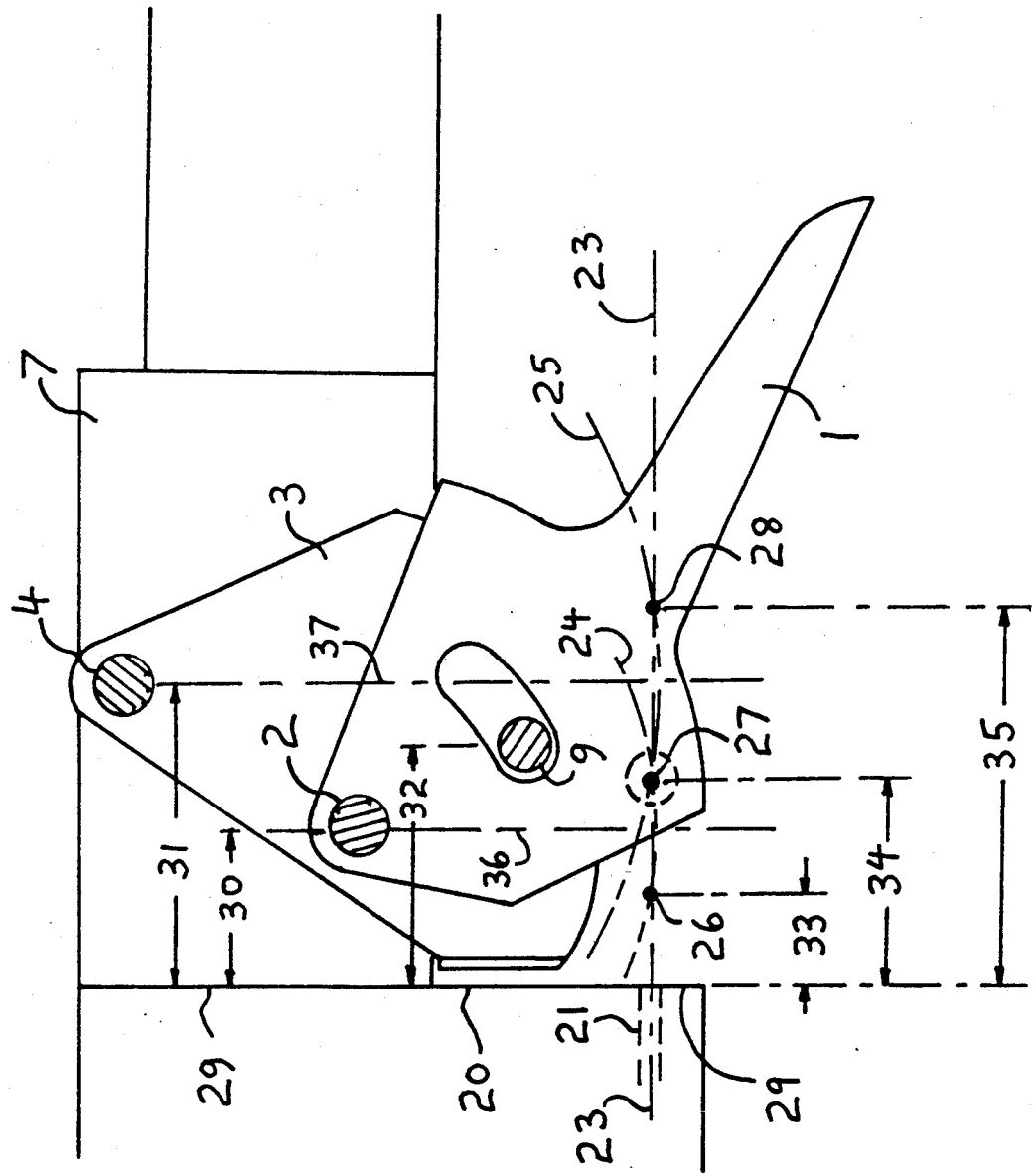
FIG. 8 is a descriptive side view showing the sequential arcs of cable travel.

In the embodiment as shown in FIG. 8 a line 29 perpendicular to handlebar 7 which is an extension of the throttle stop point 20 is shown. The throttle cable housing 21 is mounted perpendicular to said line 29 and therefore parallel to the handlebar 7.

From idle to the mid-range position the relative positions of pivot point 2, pivot point 4 and limiting pin 9 do not change. In the preferred embodiment the distance 31 should be greater than the distance 30. This will ensure that the sections of the arcs of travel marked 24 and 25 along which the throttle cable pivot attachment pin moves will minimize the bending of the throttle cable where said throttle cable exits the throttle cable housing 21.

Further, as shown in FIG. 8, reference 24 represents an arc described from pivot point 2 and reference 25 represents an arc described from pivot point 4. In this embodiment the throttle cable end follows arc 24 from point 26 at idle to point 27 at mid-range and further follows arc 25 from point 27 at mid-range to point 28 at full throttle.

Further, the preferred embodiment should have distances 33 being less than or equal to 30 and 30 being less than or equal to 34 and also distances 34 being less than or equal to 31 and 31 being less than or equal to 35. This will ensure that the motion of the throttle cable will have the least deflection as it exits the throttle cable housing 21. This will also decrease throttle cable wear in this area. Reference line 23 represents the line which the throttle cable end would travel if it extended straight out of the throttle cable housing 21.

In the best case scenario the imaginary lines 36 and 37 perpendicular to the handlebar 7 and perpendicular to the throttle cable housing 21 and which line 36 travels through the centre of pivot pin 2 and which line 37 travels through the centre of pivot pin 4 should intersect their respective arc sections line 36 intersecting arc 24 at a point centred between point 26 and point 27 and line 37 intersecting arc 25 at a point centred between point 27 and point 28.

Figure 9:
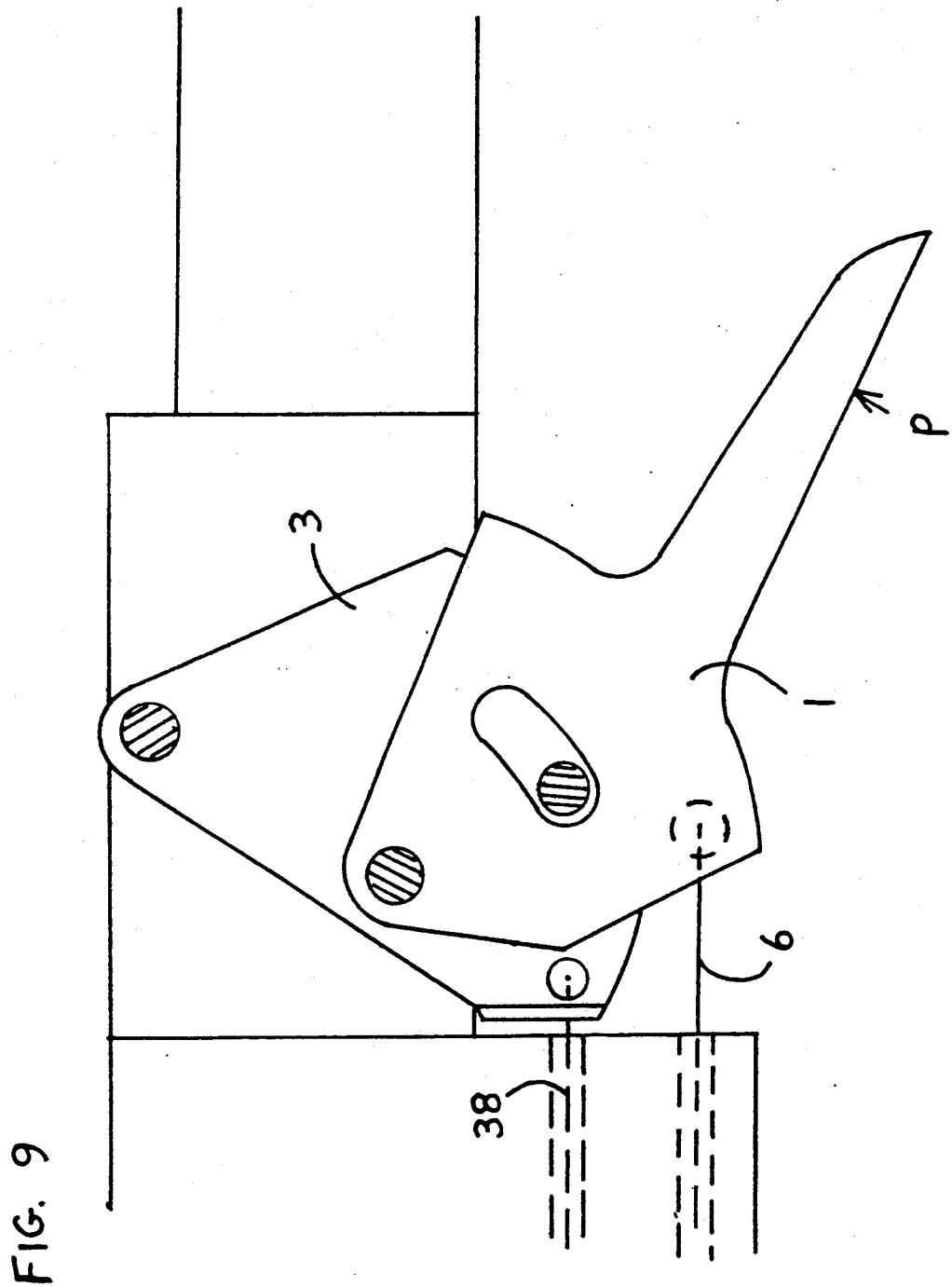
FIG. 9 is a side elevational view showing dual control links.

In my embodiments the distance 32 is between distances 30 and 31. This distance 32 in such a position is not essential. FIG. 9 shows a configuration in which a second control cable 38 is attached to the secondary lever 3. As can be seen the throttle cable 6 is extended to midrange solely by the primary lever 1. At this point, further thumb pressure P will engage the secondary lever 3 to pivot thereby extending the secondary or accessory control cable 38. This affords a method of engaging a further control function at a preselected midrange throttle position. The two control cable links will move concurrently from midrange to full throttle and back to midrange.

The embodiments of the invention to which an exclusive property or privilege is claimed are defined as follows:

1. In a vehicle having a steering mechanism that includes handlebars terminating in handgrips for engagement by a driver's hands, a thumb-activated primary throttle lever adapted for pivotal motion about a mounting bracket attached to the handlebars and biased towards a closed position by a spring-loaded throttle cable attached to said primary lever and said primary lever located adjacent one said handgrip such that when said one handgrip is grasped by the corresponding hand of the driver the thumb of that hand is in position to manipulate said primary lever away from said closed position and thus control operation of the vehicle engine, the improvement comprising:

a secondary lever of bifurcate construction of which two generally parallel plate-like limbs are adapted to straddle the said mounting bracket and are mounted for pivotal motion about said mounting bracket by a secondary axis attached to said mounting bracket, said primary lever having a proximal end that is bifurcate and defines two generally parallel plate-like limbs and a distal end for engagement by the thumb of the driver, and said primary lever being mounted for pivotal motion astride said secondary lever by a primary axis secured to said secondary lever, interengaging formations on confronting surfaces of the bifurcate limbs of the primary and secondary levers, and said interengaging formations being adapted to limit the degree of pivotal motion of said primary lever relative to said secondary lever, said primary lever being adapted to perform a two stage extension of the said throttle cable initially about said primary axis and consequently about said secondary axis, said axes being so located that during the first stage of pivotal motion of said primary lever about said primary axis away from the closed position an actuating force applied by the driver's thumb acts at a greater mechanical advantage than during a second stage of pivotal motion about said secondary axis.

2. A vehicle according to claim 1 wherein said interengaging formations comprise pin and elongate slot means.

3. A vehicle according to claim 2 wherein the pin means shall be user adjustable into various positions within the confines of the said elongate axial slot means thereby providing various degrees of primary lever motion about the primary axis.

4. A vehicle according to claim 1 wherein a series of successive threaded holes are adapted to attach a threadably secured abutment on the side of the said mounting bracket in such various positions that an abutting contact of a section of the secondary lever to the said abutment will form an adjustable full throttle stop.

5. A vehicle according to claim 1 wherein a control link is pivotally attached to said secondary lever thereby affording the engagement of a secondary vehicle control function as the secondary lever pivots about the secondary axis.

6. A vehicle according to claim 1 wherein the primary and secondary axes are spaced and so located that the throttle cable is extended in two sequential arcs of motion about the spaced primary and secondary lever axes such that the points of beginning and ending of the said sequential arcs of motion define points of a straight line thereby affording a minimum amount of deflection of the throttle cable.

7. A vehicle steering mechanism comprising:
handlebars terminating in handgrips for engagement by the driver's hands;
a primary throttle lever adapted for pivotal motion about a mounting bracket attached to the handlebars and biased towards a closed position by a spring-loaded throttle cable attached to said primary lever, said primary lever being located adjacent one said handgrip such that when said one said handgrip is grasped by the corresponding hand of the driver the thumb of that hand is in position to manipulate the primary lever away from said closed position and thus control operation of the vehicle;
a secondary lever adapted to be mounted for pivotal motion about said mounting bracket by a secondary axis secured to said mounting bracket,
said primary lever having a proximal end adapted to be mounted for pivotal motion over said secondary lever by a primary axis secured to said secondary lever, and a distal end adapted for engagement by the driver's thumb,
interengaging formations on confronting surfaces of said primary and secondary levers,
said interengaging formations being adapted to permit the primary lever to pivot from the closed position and extend the throttle cable to a limited degree about the primary axis in a first stage of motion and said interengaging formations to consequently urge the primary and secondary lever together into pivotal motion about the secondary axis and thereby further extend the throttle cable in a second stage or motion,
said axes being so located that during the first stage of pivotal motion of said primary lever about said primary axis away from the closed position an actuating force applied to the distal end of the primary lever by the driver's thumb acts at a greater mechanical advantage than during the second stage of pivotal motion about said secondary axis.

8. A vehicle according to claim 7 wherein the primary lever comprises a proximal end that is bifurcate and defines two generally parallel plate-like limbs adapted to straddle said secondary lever, and a distal end for engagement by the driver's thumb and wherein said secondary lever is of bifurcate construction of which two generally parallel plate-like limbs are adapted to straddle the said mounting bracket and wherein each of said primary and secondary axes are adapted to pivotally mount the primary and secondary levers by their respective bifurcate limbs.

9. A vehicle according to claim 7 wherein said interengaging formations comprise pin and elongate axial slot means.

10. A vehicle according to claim 8 wherein the interengaging formations are comprised of pin and elongate axial slot means and are duplicated so as to be present in each of the confronting surfaces of the said bifurcate limbs of the primary and secondary levers.

* * * * *